Dec. 28, 1954   J. B. ARMITAGE   2,697,965
MACHINE TOOL

Filed May 17, 1946   7 Sheets-Sheet 1

Fig. 1

Inventor
Joseph B. Armitage
By W. D. O'Connor
Attorney

Fig. 3

Dec. 28, 1954    J. B. ARMITAGE    2,697,965
MACHINE TOOL

Filed May 17, 1946    7 Sheets-Sheet 5

Inventor
Joseph B. Armitage
By W. D. O'Connor
Attorney

Inventor
Joseph B. Armitage
By W. D. O'Connor
Attorney

United States Patent Office 2,697,965
Patented Dec. 28, 1954

2,697,965

MACHINE TOOL

Joseph B. Armitage, Wauwatosa, Wis., assignor to Kearney & Trecker Corporation, West Allis, Wis., a corporation of Wisconsin Application May 17, 1946, Serial No. 670,563

31 Claims. (Cl. 90—20.5)

This invention relates generally to machine tool structures and actuating mechanisms therefor and more particularly to improved supporting and driving arrangements for a rotary cutter of a milling machine.

A general object of the invention is to provide improved supporting and driving apparatus for a machine tool.

Another object of the invention is to provide an improved spindle driving mechanism for a machine tool, including arrangements for adjusting the flywheel effect associated with the spindle.

Another object is to provide an improved machine tool spindle driving mechanism including a plurality of flywheels associated with the spindle and arranged to be clutched to it selectively in order to adjust the moment of inertia or flywheel effect of the rotating spindle in accordance with its speed of operation.

Another object is to provide an improved variable speed spindle driving mechanism for a machine tool capable of operating over a wide range of speeds.

Another object is to provide improved means for maintaining the temperature of a machine tool transmission mechanism substantially uniform to prevent thermal expansion of the mechanism.

Another object is to provide an improved interlocked speed control shifting mechanism for a machine tool transmission.

Another object is to provide an improved milling machine having a large flywheel mounted adjacent to the cutter receiving end of the spindle, together with an improved overarm structure arranged for removal laterally of the spindle to obviate interference with the flywheel.

Another object is to provide an improved overarm structure for a milling machine.

Another object is to provide an improved overarm supporting mechanism for a milling machine, so arranged that the overarm may be removed laterally from its operating position to an inactive position.

Another object is to provide improved means for supporting a driving motor on a machine tool.

A further object is to provide an improved spindle driving arrangement for a machine tool, wherein the spindle may be driven by means of speed reducing mechanism or directly from the driving power source, selectively.

According to this invention, a machine spindle such as the cutter driving spindle of a milling machine, is arranged to have different moments of inertia or flywheel effect in accordance with its speed of rotation and the work at hand. To this end, a plurality of flywheels are mounted concentrically with but independently of the spindle and arranged to be clutched to it selectively. Each flywheel is driven by constantly meshing gearing at a speed appropriate to its inertia, and the clutches are interlocked to prevent simultaneous engagement of more than one flywheel with the spindle. A driving motor may be connected selectively to the gearing driving the flywheels or directly to the spindle for driving it independently at high speed. An arrangement is provided for refrigerating the lubricating oil supplied to the spindle bearings for preventing thermal expansion under high speed operation. The flywheel clutches may be actuated mechanically, electrically or hydraulically with suitable interlocking controls and the driving motor may be shifted either manually or by power with suitable interlocks. To obviate interference with the large flywheels, the cutter supporting overarm structure is mounted on the face of the milling machine for sliding or pivotal removal laterally from its operating position.

The stated and other objects of this invention, which will become more fully apparent from the following detailed description, may be achieved through embodiment of the invention in structures such as the exemplifying apparatus depicted in and herein described in connection with the accompanying drawings, in which.

The features of the present invention are illustrated in the drawings as embodied in milling machines of two types, with various additional modifications of structural details, although it is to be understood that the principles of the invention may be incorporated in various other machine tools or other mechanisms with advantageous results. Of the two machines shown, the milling machine illustrated in Fig. 1 is of the horizontal spindle, knee and column type, while the machine shown in Fig. 2 is of the horizontal spindle, fixed bed type.

Figure 1:
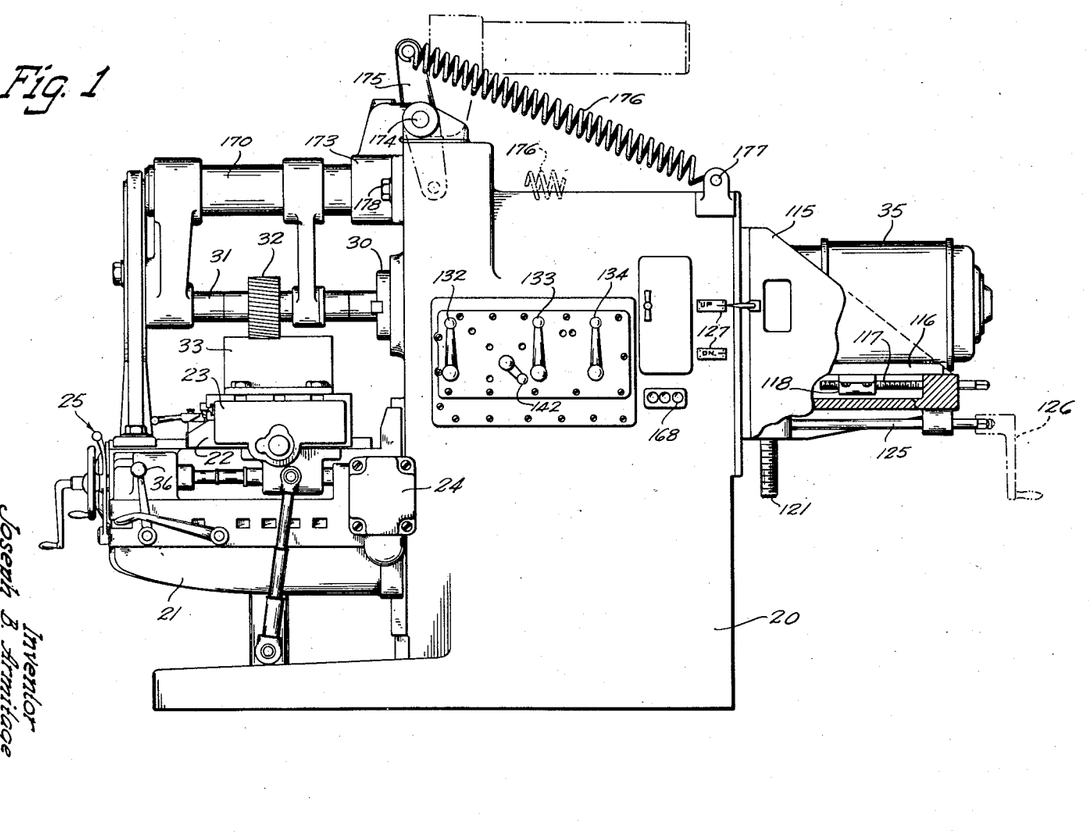
Figure 1 is a view in right side elevation of a milling machine of the knee and column type embodying the several features of the invention.

Referring more specifically to the drawings and particularly to Fig. 1 thereof, the knee type milling machine there shown comprises essentially a combined base and column structure 20 that constitutes the supporting frame of the machine. Slidably mounted on the forward face of the column for vertical adjustment is the usual work supporting knee 21 carrying a horizonally adjustable saddle 22. The saddle 22, in turn, carries a longitudinally slidable work holding table 23. A driving motor 24, mounted on the side of the knee 21, is connected to operate under the control of levers 25 operably mounted on the front of the knee, to effect the usual movements of the knee, saddle and table.

The upstanding column 20 also carries a horizontally disposed cutter driving spindle 30 that is operatively connected to drive an arbor 31 carrying a milling cutter 32 in cooperating relationship with a workpiece 33 mounted on the table 23. The spindle 30 is arranged to be driven by a spindle motor 35, mounted on the back of the column 20 and electrically interconnected with the table driving motor 24 under the control of a starting lever 36 on the knee 21.

Figure 2:
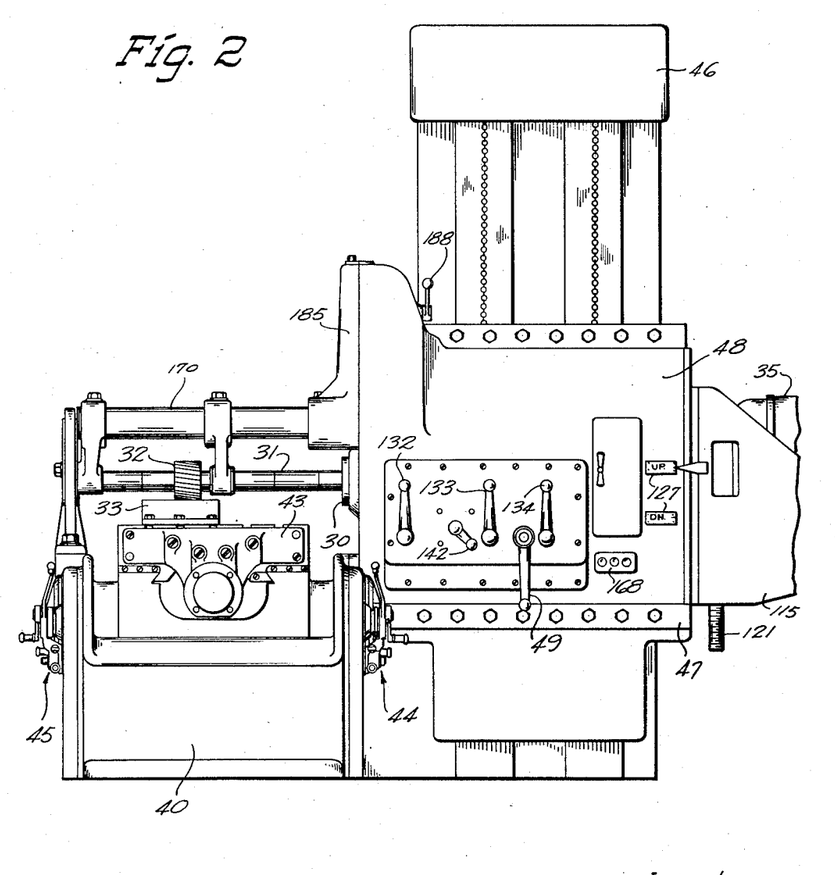
Fig. 2 is a similar view of a milling machine of the bed type, in which the features of the invention are embodied.

The bed type machine illustrated in Fig. 2 comprises essentially a bed or base 40, upon which a table 43 is slidably mounted for longitudinal movement through operation of a motor (not shown) mounted within the base 40 and under the control of levers 44 and 45 in a well known manner. At the rear of the table 43, the bed 40 supports an upstanding column 46, upon which a saddle 47 is slidably mounted for vertical adjustment. The saddle 47 carries a spindle head 48 arranged for horizontal sliding movement on the saddle by operation of a hand crank 49.

In the bed type machine, the head 48 carries the horizontally disposed spindle 30 in the same manner that it is carried in the column 20 of the knee type machine shown in Fig. 1. As shown, the spindle 30 is similarly connected with the arbor 31 carrying the cutter 32, which engages the workpiece 33 on the table 43. Likewise, the spindle driving motor 35 is mounted on the back of the head 48 in a manner similar to the mounting of the motor on the back of the column 20 in the knee type machine.

Figure 3:
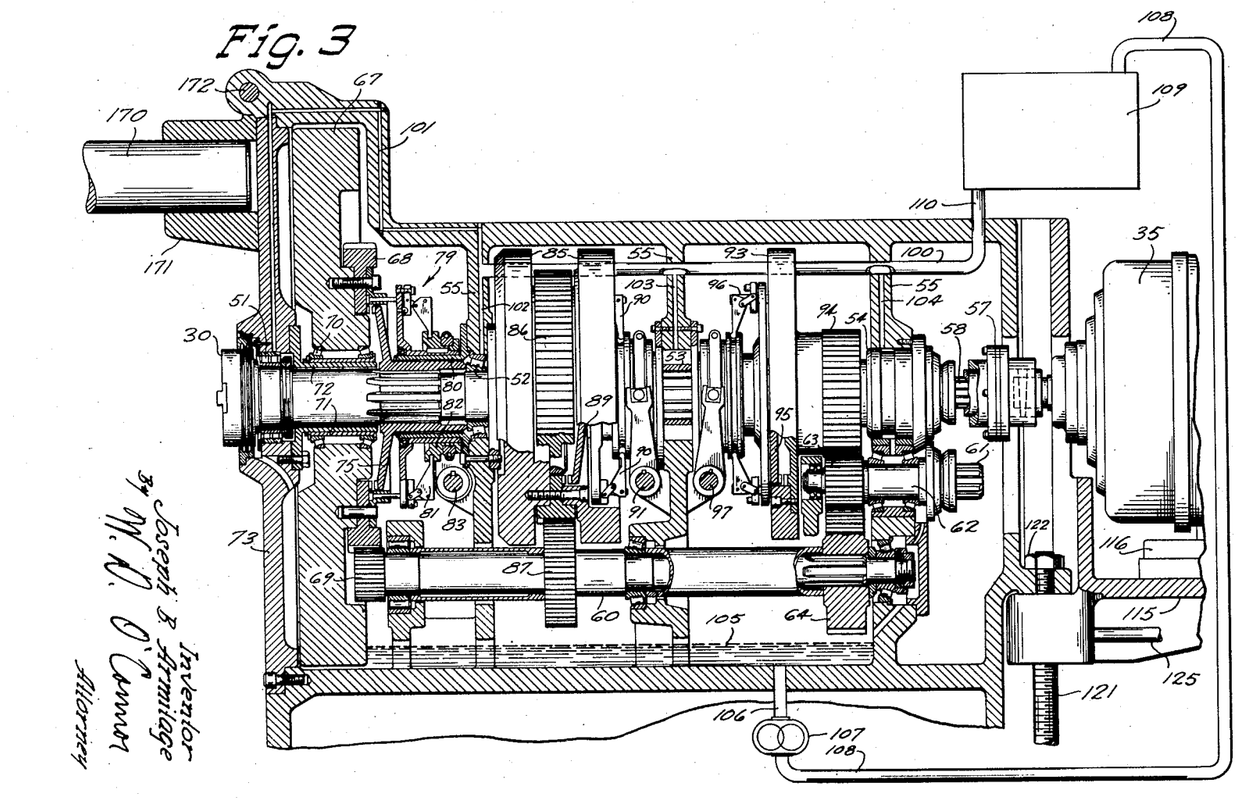
Fig. 3 is an enlarged view, largely in vertical, longitudinal section, showing the details of the cutter spindle driving mechanism incorporated in the machines shown in Figs. 1 and 2.

The mechanisms for driving the spindles 30 mounted in the column 20 and the head 48 are essentially the same in both machines and are illustrated in detail in Fig. 3, which represents a substantially longitudinal sectional view, taken along the spindle 30 through the driving mechanism in either the column 20 or the head 48. As there shown, the spindle 30 is rotatably mounted in anti-friction bearings 51, 52, 53 and 54 carried by transverse webs 55 constituting parts of the supporting framework within the column 20 or head structure 48, as the case may be.

For driving the cutter 32 at high speed, the spindle motor 35 may be directly coupled to the spindle 30, as shown in Fig. 3, by means of a coupling 57 pinned to the shaft of the motor and having disconnectible engagement with splines 58 on the end of the spindle opposite that which drives the cutter. The spindle motor 35 is reversible and may be of the adjustable speed type to provide for variations in the spindle speed within the range of operation of the motor.

In order to operate the spindle 30 in lower speed ranges, the drive is effected through a speed reducing mechanism including a jack shaft or countershaft 60 which is connected to the spindle by reduction gearing to provide a mechanical advantage in the drive train. For driving the spindle in the lower speed ranges, the spindle motor 35 is moved bodily to disengage the coupling 57 from the splined end 58 of the spindle and to engage the coupling alternatively with splines 61 on the end of a stub shaft 62 that carries a pinion 63 meshing with a gear 64 on the countershaft 60. Said stub shaft 62 and countershaft 60 constitute a spindle drive shaft means.

When the operating conditions are such that the milling cutter 32 can be driven at high speed through direct connection of the spindle with the motor 35, smooth operation of the cutter is effected without difficulty, since the flywheel effect or moment of inertia of the rapidly rotating directly connected cutter spindle and motor rotor is sufficient to prevent vibration and chatter of the cutter, even though the cutting load many be relatively heavy. However, when it is necessary to operate the cutter at low speed, as in the case where a heavy cut is taken with a large cutter, particularly when milling steel with cemented carbide tipped cutter blades, the flywheel effect of the slowly rotating spindle and cutter is not sufficient to overcome uneven cutting action.

In accordance with an important feature of the present invention, arrangements are made to adjust the flywheel effect of the rotating spindle in order that it may be made appropriate to the speed of operation of the cutter, the apparatus being so constructed that the proper flywheel effect or moment of inertia is established in connection with selecting the driving ratio of the gearing between the driving motor and the spindle. To this end, there is provided a plurality of flywheels mounted in the frame concentric with, but independently of the spindle 30, together with clutching means for coupling any one of the flywheels to the spindle selectively.

For operating in the lowest speed range, for instance when driving a large cutter, it is desirable that a heavy flywheel of large moment of inertia be provided and that it be positioned as near as possible to the cutter receiving end or nose of the spindle 30. As shown in Fig. 3, a relatively large and heavy flywheel 67 is rotatably mounted concentric with the spindle 30 near its forward end or nose and is provided with a relatively large gear wheel 68, meshing with a small pinion 69 on the countershaft 60, in manner to provide a large speed reducing ratio. Although mounted concentrically with the spindle 30, the flywheel 67 is independently supported upon anti-friction bearings 70 carried by a sleeve 71, which is slidably mounted on a supporting sleeve 72. The latter is fixed to and projects inwardly from a cover plate 73, which forms a closure for the flywheel receiving opening at the front of the machine and constitutes the transverse web that carries the forward, radial spindle bearing 51.

Figures 10, 11:
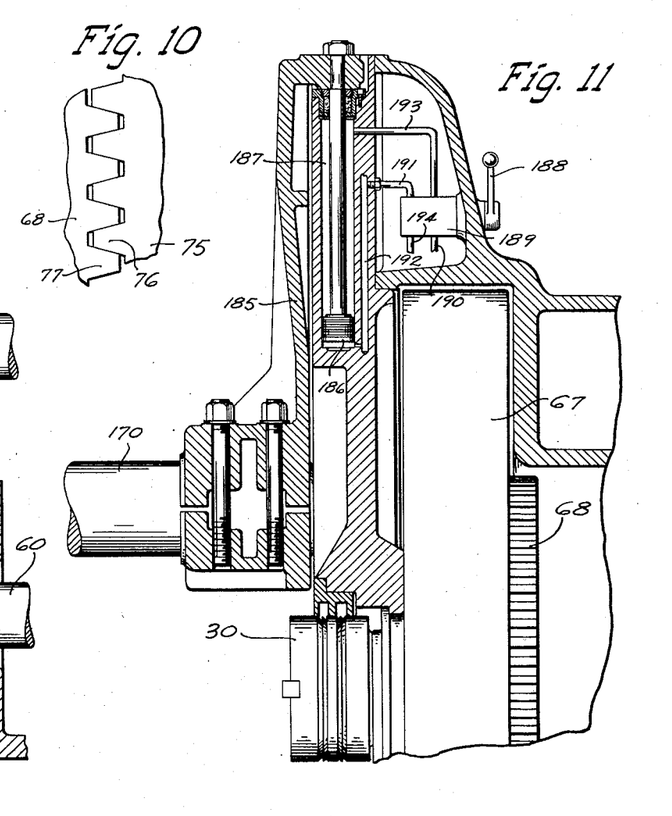
Fig. 10 is a fragmentary detailed view, taken along the line 10—10 in Fig. 9 and showing the manner in which the teeth of the positive jaw clutches engage.
Fig. 11 is another fragmentary view in vertical section, showing a modified overarm structure with power actuating mechanism.

For effecting a disengageable positive driving connection between the flywheel 67 and the spindle 30, there is provided a positive jaw clutch, one element 75 of which is splined to the spindle 30 and presents axially disposed clutch teeth 76 that are adapted to intermesh, as shown in Fig. 10, with similar complementary clutch teeth 77 formed on the web of the gear wheel 68. In order to engage the positive clutch, the entire flywheel 67 is moved axially by sliding its supporting sleeve 71 along the fixed supporting sleeve 72 to bring the clutch teeth into meshing engagement. This is accomplished by means of an adjustable clutch actuating toggle mechanism 79, which is secured to and rotates with the gear wheel 68 and operates in well known manner to lock the clutch in engaged position.

In order to avoid frictional action when the spindle 30 is being driven at a higher speed, the clutch actuating mechanism 79 is mounted for rotation independently of the spindle upon a supporting sleeve 80, which is secured to and projects forward from the web 55 that supports the second spindle bearing 52. The clutch actuating mechanism includes the usual toggle fingers 81, the ends of which engage with a grooved shifting collar or spool 82, slidably mounted on the fixed supporting sleeve 80 and movable axially to operate the toggle fingers for engaging or disengaging the positive clutch, through turning movement of a clutch control shaft 83, which operates upon the collar 82 in well known manner.

A second flywheel 85 is rotatably mounted in similar manner concentric with but independently of the spindle 30 between the second spindle bearing 52 and the third spindle bearing 53. This flywheel is formed in two parts, with a gear wheel 86 interposed between them in position to mesh with a pinion 87 on the countershaft 60. The driving ratio of the gear wheel 86 and the pinion 87 is somewhat lower than that between the gear wheel 68 and the pinion 69, in order to provide for the operation of the spindle at a somewhat higher speed; the flywheel 85 is smaller and of less moment of inertia in order to be of appropriate inertial effect to correspond with the somewhat higher spindle speed. A positive clutch element 89, which is splined to the spindle 30, presents axially disposed clutch teeth that engage with complementary teeth on the web of the gear wheel 86 for effecting a positive driving connection between the flywheel, its driving gear, and the spindle. Likewise, a clutch actuating toggle mechanism 90 is arranged to effect engagement or disengagement of the positive clutch by moving the flywheel 85 axially through turning movement of a clutch actuating shaft 91.

A third flywheel 93 of still less moment of inertia is rotatably supported concentrically with, but independently of, the spindle 30 and is located, between the third spindle bearing 53 and the fourth spindle bearing 54. Associated with the flywheel 93, is a smaller gear wheel 94 that is arranged to mesh with the pinion 63 of the driving stub shaft 62 which latter pinion also has meshing engagement with the gear wheel 64 on the countershaft 60. The driving ratio between the pinion 63 and the gear 94 on the flywheel 93 is less than that between the pinion 87 and the gear 86, in order to provide for a still higher range of operation of the spindle 30, the flywheel 93 being smaller and lighter than the flywheel 85, in order that its inertial effect may be appropriate to the higher speed of rotation. A positive clutch, including a tooth carrying element 95 fixed on the spindle 30 and complementary teeth formed on the flange of the gear 94, serves to couple the flywheel 93 rigidly to the spindle. Selective engagement or disengagement of the clutch is effected by means of toggle actuating mechanism 96 that is operated by turning a clutch actuating shaft 97.

As previously mentioned, when the motor 35 is directly connected to the spindle, as shown in Fig. 3, the spindle is rotated at high speed within its supporting anti-friction bearings and entirely out of frictional contact with the various flywheels and clutch actuating mechanisms, the flywheels and countershaft 60 remaining stationary. In order to prevent heating of the spindle bearings at high speeds, and thermal distortion of the spindle and its supporting structure, arrangements are provided for furnishing a copious supply of refrigerated lubricant to each bearing. As shown in the drawing, the lubricant is delivered to the bearings through a header 100, which passes through the webs 55 of the spindle supporting frame. From the header 100, a conduit 101, formed in the machine frame structure and the front plate 73, leads to the first spindle bearing 51. A similar conduit 102, formed in the forward web 55, leads to the second spindle bearing 52. In the same manner, a conduit 103 in the second web 55 leads to the third spindle bearing 53 and a conduit 104 in the last web leads to the fourth spindle bearing which is the thrust bearing 54. From the spindle bearings, the lubricant overflows into the bearings of the stub shaft 62 and the countershaft 60 and the excess lubricant collects in a sump 105 formed in the machine frame below the countershaft. From the sump 105, the lubricant is withdrawn through a conduit 106 into a pump 107, which forces it through a conduit 108 into a refrigerating apparatus 109. After being cooled to the desired extent by the refrigerating apparatus 109, the lubricant is discharged through a conduit 110, which is connected to the distribution header 100 in the machine frame. By this arrangement, the temperature of the spindle 30 and its supporting structure may be maintained substantially constant to obviate inaccuracies which might otherwise result from thermal expansion of these elements when operating at high speeds.

When it is desired to operate the spindle 30 at a low speed, the spindle motor 35 is moved bodily to disconnect it from the spindle and to connect it with the countershaft drive, as previously mentioned. To provide for the necessary bodily movement, the spindle motor 35 is carried by a vertically movable bracket 115, upon which it is supported by means of a horizontally movable base plate 116. As best shown in Fig. 1, the motor 35 may be disconnected from the spindle 30 by retracting the motor axially through turning a screw 117 that is rotatably mounted in the bracket 115 and that operates within a nut 118 fixed to the slidably mounted motor base 116. After the motor has been retracted a sufficient distance to clear the splined end 58 of the spindle, the entire motor bracket 115 may be lowered by sliding it downward along the back of the spindle supporting column or head, through operation of a screw and nut elevating mechanism.

Figures 4, 5:
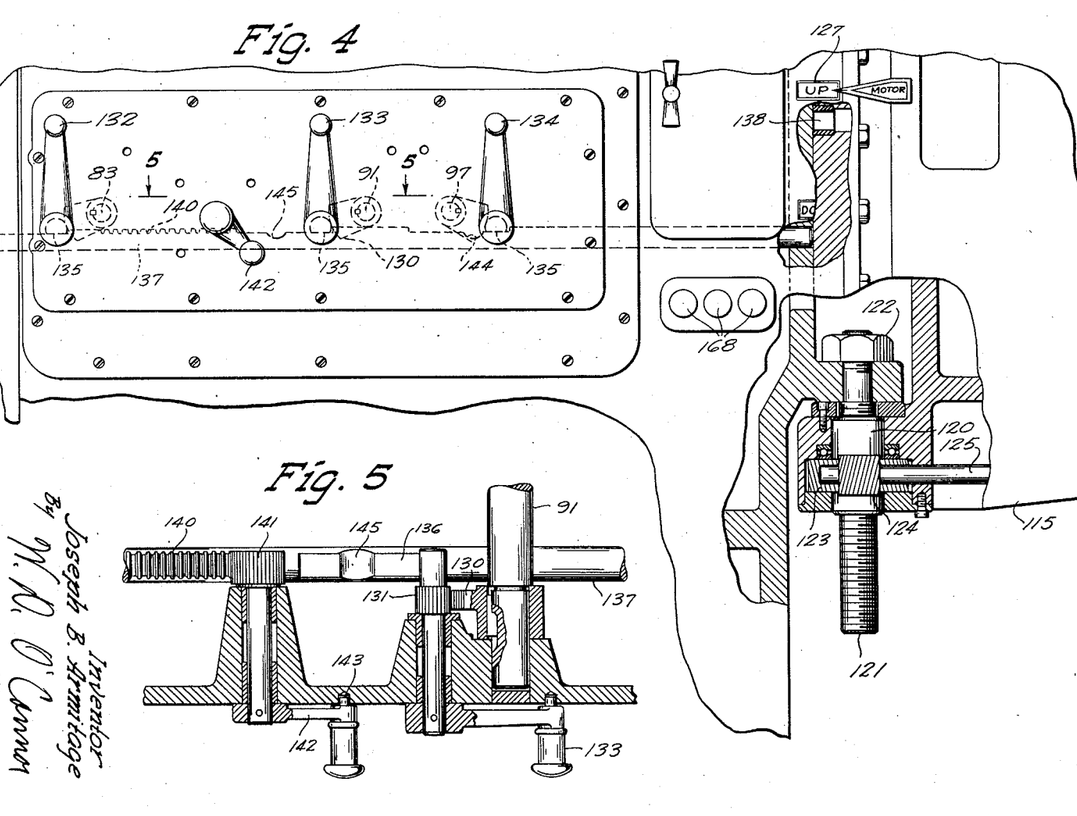
Fig. 4 is a fragmentary enlarged view of the spindle carrying portions of the machines shown in Figs. 1 and 2, parts having been broken away to show the internal control mechanism.
Fig. 5 is a fragmentary view taken in horizontal section on the line 5—5 of Fig. 4 and showing the clutch shifting interlocking mechanism.

As best shown in Fig. 4, the bracket 115 carries a rotatably mounted nut 120, which has threaded engagement with a vertically disposed elevating screw 121 that is fixed in a lug on the machine frame and is held stationary by a locking nut 122. The rotatable nut 120 is fitted with a worm wheel 123 that is engaged by a worm 124 on a horizontal actuating shaft 125 that extends rearwardly to the outer end of the bracket 115. A detachable crank 126, shown in Fig. 1, fitted on the end of the shaft 125, may be turned to lower the motor to the position in which its coupling 57 is in alignment with the splined end 61 of the stub shaft 62, the position of the coupling being indicated by indicia 127 on the machine frame. The crank handle 126 may then be removed and applied to the end of the screw shaft 117, which is then turned to advance the motor 35 and engage the coupling 57 with the splined end 61 of the stub shaft.

When the motor 35 is operated while connected to the stub shaft 62, the countershaft 60 is rotated at a speed depending upon the speed of the motor and each of the three flywheels is rotated continuously at the speed established by the ratio of its geared connection with the motor. With all of the flywheel clutches disengaged, the flywheels are free to turn at their respective speeds, entirely independently of the spindle 30, which will remain stationary.

In order to obviate the possibility of more than one flywheel being clutched to the spindle simultaneously and to prevent any flywheel from being clutched to the spindle when the motor is connected directly to it for operation at high speed, there is provided an interlocking control mechanism best shown in Figs. 4 and 5. As there shown, each of the clutch actuating shafts 83, 91 and 97 is provided with a gear segment 130, which meshes with an actuating pinion 131, the pinions being mounted on the shafts of actuating crank handles 132, 133 and 134, respectively.

Each crank handle shaft is further provided with a flat spot or face 135 on its periphery adjacent to the pinion 131, which operates as an interlock. With the clutch actuating cranks 132, 133 and 134 each in vertical position, as shown in Fig. 4 and in Figs. 1 and 2, all of the flywheel clutches are disengaged and the interlocking flat spots 135 are horizontally disposed on the lower sides of the crank handle shafts. When in this position, the interlocking faces 135 are adapted to cooperate with complementary flat interlocking faces 136 formed on the upper surface of an interlocking control bar or rod 137 disposed horizontally beneath the three lever shafts. With the spindle motor bracket 115 in the upper or direct drive position, as shown in Fig. 4, the right end of the bar 137 engages the forward face of the bracket 115, and the interlocking faces 136 on the bar engage the corresponding interlocking faces 135 of the crank shafts, thereby locking the levers 132, 133, and 134 in clutch disengaging position and preventing the engagement of any flywheel clutch while the motor is directly connected to the spindle for driving it at high speed.

When the motor bracket 115 is moved down to its lower position for driving connection with the countershaft, a socket 138 in the front wall of the bracket moves into alignment with the end of the interlocking bar 137 in manner to permit movement of the bar to the right. As shown, the interlocking bar 137 is provided with rack teeth 140, which are engaged by a pinion 141 on the shaft of a speed selecting crank 142. The crank 142 is provided with a latching plunger 143 that is arranged to latch it in any one of four positions, as indicated in Fig. 4. If, now, the crank 142 is unlatched from the position shown and turned counterclockwise to the next position, the interlocking bar 137 will be moved to the right into the socket 138, thereby moving a clearance notch or groove 144 in the upper surface of the bar to a position directly beneath the interlocking surface 135 of the right hand clutch actuating lever 134. This will permit the lever 134 to be moved to clutch engaging position to clutch the flywheel 93 to the spindle 30.

If, now, it is desired to operate the spindle in a still lower speed range, the lever 134 must first be moved to clutch disengaging position, whereupon its shaft disengages from the interlocking notch 144 in the bar to permit further movement of the bar. The crank 142 may then be turned to its third position, whereupon the notch 144 in the bar moves out of alignment with the shaft of the lever 134, thereby locking it in disengaged position, while simultaneously another notch 145 in the bar moves under the interlocking face 135 of the lever 133. This permits the lever 133 to be actuated to engage the clutch for connecting the intermediate flywheel 85 to the spindle 30.

To bring the low speed flywheel 67 into operation, the lever 133 is first moved to a clutch disengaging position, whereupon the crank 142 may be turned to its fourth position, thereby advancing the interlocking bar 137 farther to the right, locking the lever 133 in disengaged position and moving the left end of the bar out from under the interlocking face 135 of the lever 132, to permit the lever to move to clutch engaging position for clutching the large flywheel to the spindle for operation at low speed. As previously explained, when the low speed flywheel 67 is clutched to the spindle, the other two flywheels 85 and 93 continue to operate at their respective higher speeds independently of the spindle.

With the interlocking bar 137 in engagement with the socket 138 in the motor bracket 115, the motor bracket is locked against movement to the position in which the motor may be directly connected to the spindle. Consequently, in order to change from a low speed range to the direct drive high speed range, any flywheel clutch which happens to be engaged, must be disengaged, in order that all three clutch levers 132, 133 and 134 will be in their vertical, disengaged positions to unlock the bar. The interlocking bar 137 may then be retracted from the socket 138 in the motor bracket, by turning the crank 142 to the first position, as shown in Fig. 4. This results in locking all of the clutches in disengaged position, as previously mentioned, before unlocking and permitting the motor bracket 115 to be raised to the direct drive position.

Although the clutch actuating and interlocking mechanism has been described as of the manually operated mechanical type, it is to be understood that the mechanism may be power operated and that equivalent control and interlocking functions may be effected by means other than the mechanical interlock shown in Figs. 4 and 5. For example, the clutches may be arranged for electrical operation in the manner illustrated in Fig. 6 with regard to the clutch associated with the large flywheel 67. As there shown, the mechanical clutch actuating toggle mechanism is replaced by a magnet coil or solenoid 150 disposed concentrically of the gear 68 and adjacent to a positive clutch element 151, which is fixed on the spindle 30 and corresponds with the clutch element 75 shown in Fig. 3. When the magnet coil 150 is energized, the clutch element 151 operates as an armature and the magnetic attraction thus established slides the flywheel 67 along the fixed supporting sleeve 72 in manner to engage axially disposed clutch teeth on a clutch ring 152 carried by the wheel, with the teeth of the clutch member 151. When the magnet 150 is deenergized, a series of coil springs 153 operate to move the flywheel 67 to the left, thereby disengaging the clutch teeth.

Figure 6:
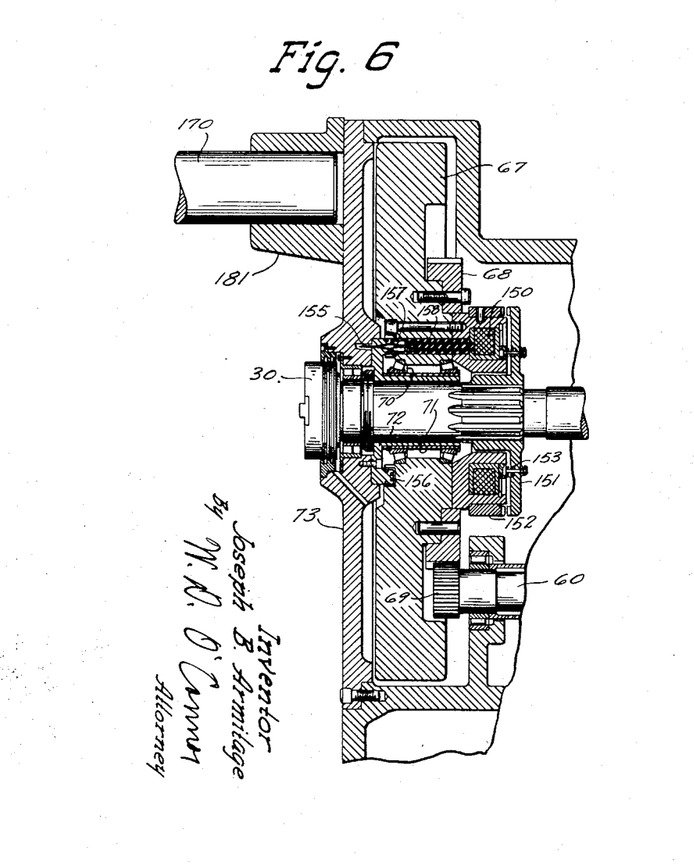
Fig. 6 is a fragmentary view in vertical section similar to part of Fig. 3 and showing a modified clutch arranged for electrical operation together with a modified overarm structure.

Electric current for energizing the magnet coil 150 is provided through a pair of conductors or leads 155 connected respectively with contact rings 156 carried by the flange of the stationary supporting sleeve 72. Spring-pressed contact brushes 157 are carried by an insulating block 158 in the flywheel 67 and engage the rings 156, the brushes 157 being movable over a sufficient distance to maintain contact regardless of the position of the flywheel 67. The other clutches of the mechanism may be arranged for electrical operation in similar manner, each clutch being controlled by an electrical switch associated with its corresponding control lever and interlocking mechanism such as is shown in Fig. 4, or alternatively, the clutches may be controlled by the operation of push buttons or a drum controller, with equivalent electrical interlocking arrangements.

Figure 9:
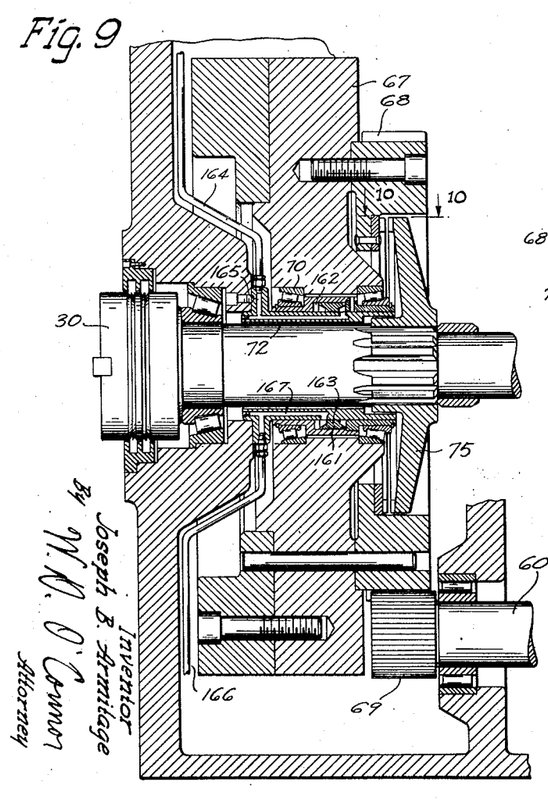
Fig. 9 is another fragmentary view in vertical section similar to Fig. 6 and showing a modified clutch arranged for hydraulic operation.

In a generally similar manner, the several clutches may be arranged for operation through hydraulic pressure means, as is the clutch structure disclosed in Fig. 9 in connection with the heavy flywheel 67. As there shown, a supporting sleeve 161, which carries the flywheel bearing 70, as does the sleeve 71, shown in Fig. 3, is shaped to form an hydraulic actuating cylinder 162. A piston 163 arranged for cooperation with the cylinder 162, is fixed on and extends radially outward from the fixed supporting sleeve 72. To effect engagement of the clutch teeth 77 on the flywheel with the cooperating clutch teeth 76 on the clutch element 75 fixed to the spindle 30, hydraulic pressure is exerted through a conduit 164 which connects with a passageway 165 formed within the supporting sleeve 72 and opening into the cylinder 162 at the right of the piston 163. Pressure within the right end of the cylinder 162 acts upon the piston 163 to force the cylinder and the flywheel 67 to the right for engaging the clutch. To disengage the clutch, pressure is admitted through a conduit 166 leading to a passage 167 in the collar 72, which opens into the left end of the cylinder 162, the pressure thus admitted causing the flywheel 67 to be moved to the left.

As in the case of the electrically operated clutch, the hydraulically actuated clutch shown in Fig. 9 may be duplicated for the other clutches of the mechanism and may be controlled through valve mechanism associated with the clutch controlling levers of the mechanical interlock shown in Fig. 4. Alternatively, control of the hydraulically actuated clutches may be effected by means of an hydraulic interlock system equivalent to the mechanical system shown in Figs. 4 and 5, and the electrical interlock previously mentioned.

The spindle driving motor 35 and the table driving motor 24, as well as a coolant supply motor and any other electrical equipment on the machine, may be suitably controlled by interconnecting control systems including push button controls 168. The control system may include suitable interlocks between the motors and the spindle driving clutches whereby, for example, the direction of rotation of the spindle driving motor 35 may be established in coordination with the driving connection selected, to provide the desired direction of rotation of the cutter spindle at all speeds.

As shown in Figs. 1 and 2, the cutter carrying arbor 31 is supported by the usual overarm structure 170 comprising parallel overarm bars and depending arbor supporting pendants. In the usual milling machine structure, the overarm bars may be removed from their positions above the arbor by pushing them inward through openings in the machine frame above the spindle. However, in the present construction, the heavy flywheel 67 is of such large diameter that it extends above the overarm bars, as shown in Fig. 3, the overarm structure 170 being closer to the axis of the spindle 30 than the radius of the flywheel. Consequently, the overarms cannot be retracted in the usual manner by axial movement into the machine structure. As shown in Fig. 3, this difficulty is overcome by mounting the overarms in a bracket 171 secured to the front of the machine and arranged for movement laterally from the region of the spindle 30. In this instance, the bracket 171 is carried by a horizontally disposed pivot pin 172 at the top of the flywheel housing. By this arrangement, the overarm structure 170 may be moved from its active position to an inactive position by pivoting it upward and backward about the pivot pin 172.

In the arrangement shown in Fig. 1, the overarm structure 170 is carried by a bracket 173, likewise mounted on a horizontally disposed pivot pin 174 for upward pivotal movement of the arms. However, in this instance, the bracket 173 is further provided with a laterally displaced crank arm 175, the end of which is engaged by one end of a tension coil spring 176, the other end of the spring being fastened to a bracket 177 at the rear of the column 20. The tension spring 176 serves as a counterbalance to assist in swinging the overarm structure 170 upward about the pivot pin 174 to the inactive position shown in dotted lines in the drawing, the spring being partially tensioned by over-center action to cushion the arrival of the overarm structure at the inactive position. When the overarm structure 170 is subsequently pivoted to its active position, the spring 176 likewise operates to cushion its return movement. The bracket 173 may then be clamped rigidly to the column 20 by tightening fastening bolts 178.

Figure 7:
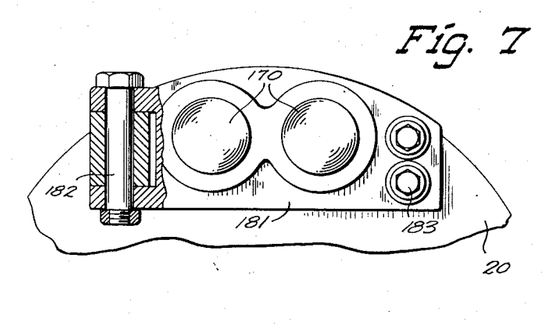
Fig. 7 is a fragmentary view in front elevation looking from the left in Fig. 6 and showing the modified overarm structure with parts broken away.
Figure 8:
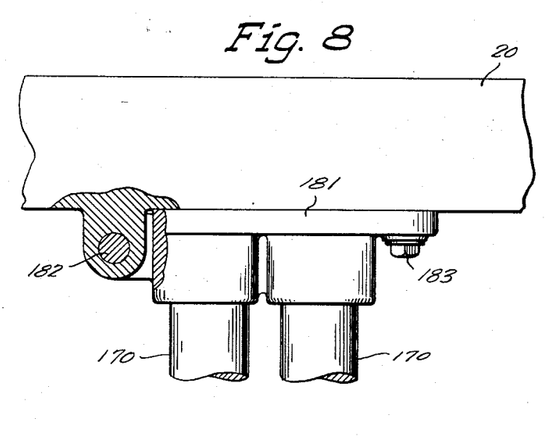
Fig. 8 is a plan view of the overarm structure shown in Fig. 7.

In a modified form of the overarm carrying arrangement which is shown in Figs. 6, 7 and 8, the overarm structure 170 is carried by a bracket 181 that is pivotally mounted on the machine frame by means of a vertically disposed pivot pin 182, the arrangement being such that the overarm structure 170 may be pivotally removed in a horizontal plane from its active position at the front of the machine to an inactive position at the left side of the machine. As shown in Figs. 7 and 8, the bracket 181 may be rigidly secured to the columns 20 in its active position by tightening clamping bolts 183.

In the modified arrangement shown in Figs. 2 and 11, the overarm structure 170 is carried by a bracket 185 slidably mounted on the front of the spindle head 48 in a manner to provide for moving the overarms vertically from the active position to an elevated inactive position. As best shown in Fig. 11, vertical movement of the bracket 185 and the overarm structure 170 may be accomplished hydraulically through operation of a hydraulic piston 186 connected to the bracket 185 and fitting within a vertically disposed cylinder 187 formed in the machine frame. As shown, the overarm structure 170 may be elevated to its inactive position by operating a hand control lever 188, which actuates a valve 189 to admit pressure fluid from a pressure source 190 through a conduit 191 and the passageway 192 leading to the lower end of the cylinder 187. The pressure fluid acting on the lower face of the piston 186 will cause it to move upward, thereby elevating the bracket 185 and the overarm structure 170. Fluid in the upper part of the cylinder will be discharged through a conduit 193, which is connected within the valve 189 to an exhaust conduit 194. In order to lower the overarm structure 170 to its active position, the hand lever 188 is actuated to turn the valve 189 in manner to admit pressure fluid from the source 190 into the conduit 193 leading to the top of the cylinder 187. Fluid in the bottom of the cylinder is at the same time exhausted through the passageway 192 and the conduit 191 which is then connected within the valve 189 to the exhaust port 194.

Figures 12, 13, 14:
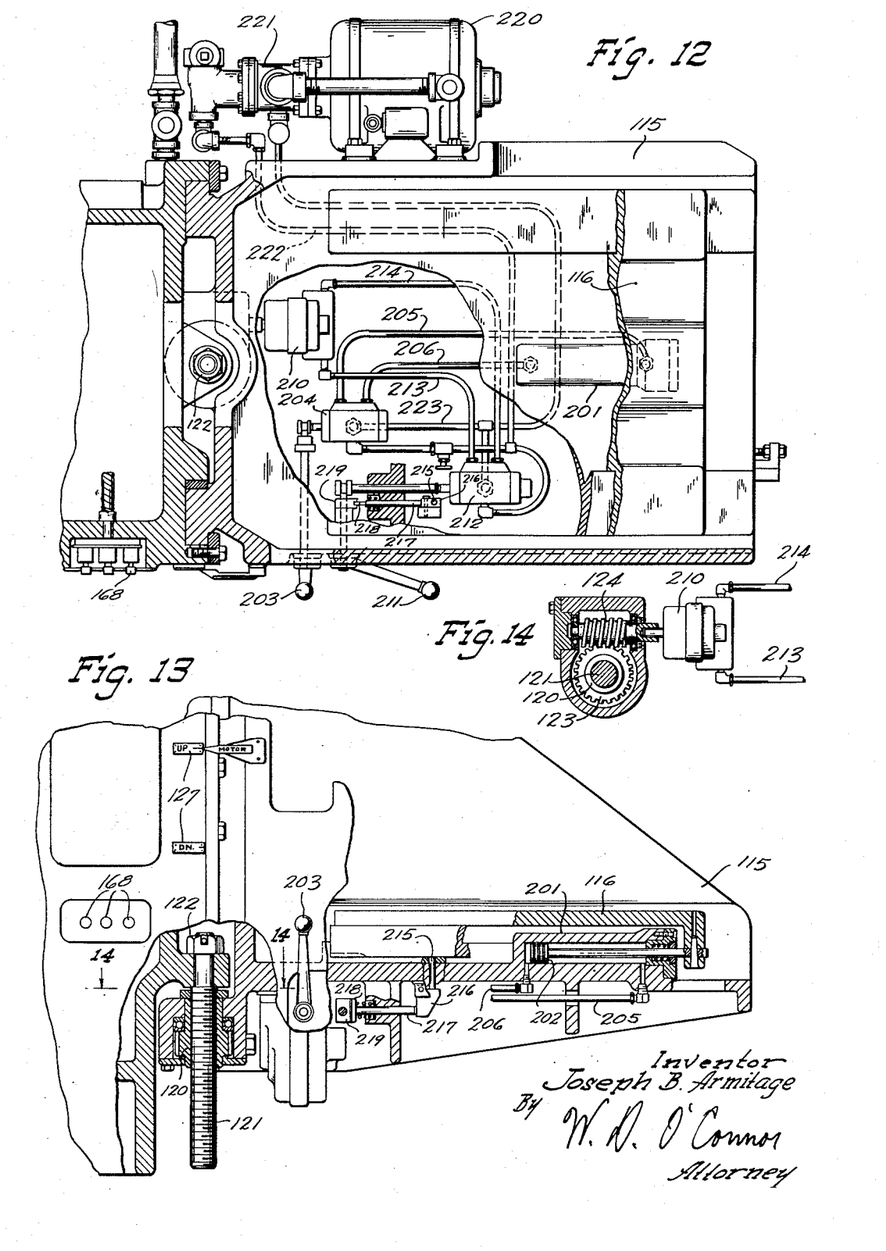
Fig. 12 is a view in horizontal section through a modified form of spindle motor supporting bracket showing power operated mechanism for effecting bodily movement of the spindle motor.
Fig. 13 is a fragmentary view, partly in side elevation and partly in vertical section, of the modified spindle motor platform shown in Fig. 12.
Fig. 14 is a detail view in horizontal section, taken along the line 14—14 in Fig. 13 and showing the power actuated elevating mechanism for the motor platform.

A generally similar hydraulic actuating mechanism may be provided for effecting bodily movement of the spindle motor 35 by power in changing its driving connection with the spindle. As shown in Figs. 12 and 13, the spindle motor supporting platform 116 may be provided with a hydraulic piston and cylinder mechanism for effecting advancing and retracting movements of the motor in coupling it to or uncoupling it from the splined shaft ends, as previously explained. As shown in Fig. 13, a horizontally disposed hydraulic cylinder 201 is formed in the motor supporting bracket 115 and is arranged to receive a piston 202 connected to the motor platform 116. A manually operated control handle 203 on the side of the bracket 115 is arranged to operate a valve 204 that controls the admission of pressure to the cylinder 201. With the lever in the position shown, fluid pressure is admitted from the valve 204 through a conduit 205 to the rear end of the cylinder 201, thereby forcing the piston 202 forward and engaging the motor coupling with the splined shaft end. By turning the lever 203 clockwise or rearwardly from the position shown, the valve 204 is moved to admit pressure through a conduit 206 leading to the front end of the cylinder 201 and forcing the piston 202 rearwardly, thereby retracting the motor coupling from the splined shaft end.

To provide for elevating or lowering the motor supporting bracket 115 by power, the worm 124, which cooperates with the worm wheel 123 on the rotatable nut 120, is connected for operation by a reversible rotary hydraulic motor 210, as best shown in Fig. 14. The hydraulic motor 210 is operated under the control of a hand lever 211 on the side of the bracket 115 that is connected to actuate a valve 212 mounted within the bracket. With the lever 211 in the horizontal position shown in Fig. 12, the valve 212 is in the closed or neutral position and the hydraulic motor 210 remains stationary. When the control lever 211 is moved to its upper position, pressure fluid is admitted from the valve 212 through a conduit 213 to the motor 210, causing it to rotate in the direction required to elevate the bracket. Exhaust fluid from the motor 210 returns through a conduit 214 to the valve 212. When the lever 211 is moved downward, the pressure fluid is caused to flow from the valve 212 through the conduit 214 into the motor 210 to cause it to rotate in the opposite direction for lowering the bracket, the exhaust fluid then returning through the conduit 213 to the valve.

In order to avoid the possibility of power being applied to raise or lower the motor bracket 115 while the motor is coupled to the one or the other shaft end, an interlocking device is provided to prevent the control lever 211 from being moved from neutral position when the motor is in its advanced or coupled position. To this end a vertically slidable interlocking pin 215 is arranged in the bracket 115 in position to be depressed by the motor platform 116 when it is moved to the left, as seen in Figs. 12 and 13. The pin 215 acts downwardly upon a pivotally mounted block 216 that operates as a bell-crank to force a control rod 217 to the left. The rod 217 is provided at its left end with a shoe 218 the face of which engages a complementary flat face on an abutment 219 fixed to the shaft of the control lever 211. As shown in the drawing, when the shoe 218 is in engagement with the abutment 219, the lever 211 is held in the horizontal, neutral position and cannot be turned to energize the hydraulic motor 210 until after the motor platform 116 has been retracted rightwardly and out of contact with the upper end of the interlocking pin 215.

In view of the fact that the bracket 115 is mounted externally of and is movable relative to the machine structure, it is convenient to provide a separate source of pressure fluid for effecting the movements of the spindle motor. For this purpose, an electric motor 220 is mounted on one side of the bracket 115, as shown in Fig. 12, together with a directly connected pressure pump 221. From the pump 221, a pressure conduit 222 leads to both the valve 204 disposed to control horizontal movement of the spindle motor and the valve 212 disposed to control vertical movement of the entire bracket. Likewise, an exhaust conduit 223 leads from both the valve 204 and the valve 212 back to the pump 221 to constitute a closed circuit hydraulic system.

From the foregoing detailed description of the illustrative structures set forth herein to exemplify the present invention, it will be apparent that there has been provided an improved supporting and driving mechanism for holding and actuating the cutter of a milling machine.

Although the several exemplary embodiments of the invention have been described in considerable detail for the purpose of fully disclosing practical working apparatus incorporating the invention, it is to be understood that the particular structures shown and described are intended to be illustrative only and that the various characteristics of the invention may be incorporated in other structural forms without departing from the spirit and scope of the invention as defined in the subjoined claims.

The principles of the invention having now been fully explained in connection with the foregoing description of illustrative embodying apparatus, I hereby claim as my invention or discovery:

1. In a milling machine, a column, a cutter carrying spindle rotatably mounted in said column, a plurality of flywheels rotatably mounted in said column concentric with said spindle, a positive clutch operatively arranged to couple each of said flywheels to said spindle selectively for rigid unitary operation therewith, and an interlocking control mechanism operatively connected to singly engage and disengage said clutches with said control mechanism being arranged to prevent engagement of more than one clutch simultaneously.

2. In a milling machine having a frame and a cutter spindle rotatably mounted in said frame, a relatively heavy flywheel rotatably mounted in said frame concentrically with but independently of said spindle, a power train operatively connected to drive said heavy flywheel at slow speed, a clutch arranged to couple said heavy flywheel to said spindle selectively, a second relatively light flywheel rotatably mounted in said frame concentrically with but independently of said spindle, a power train operatively connected to drive said light flywheel at moderate speed, a clutch arranged to couple said light flywheel to said spindle selectively, and power actuated means selectively connectible to drive said spindle directly at high speed, the arrangement being such that the flywheel effect associated with said spindle is automatically correlated with the speed of rotation of the spindle.

3. In a machine tool having a driving mechanism, a spindle rotatably journalled in said machine, a movable power source in said machine selectively connectible to drive said spindle directly, a variable speed transmission in said machine effecting alternative spindle driving means, a separate input power shaft in said transmission, said movable power source selectively connectible to drive said input power shaft, a plurality of flywheels independently journalled in said machine to form a part of said transmission, said flywheels journalled concentrically with but separately from said spindle and arranged for controlled axially slidable movement, individual clutch elements mounted on each of said flywheels, complementary clutch elements affixed to said spindle, shifting means operable to move said flywheels selectively into cooperating clutch engagement with said spindle, and interlocking means operable on said shifting means to prevent engagement of any of said flywheels when said power source is connected to drive said spindle direct, said interlocking means also operable to prevent simultaneous engagement of any two or more of said flywheels when said power source is connected to drive said transmission input power shaft.

4. In a machine tool, a column, a spindle rotatably mounted in said column, a plurality of flywheels rotatably mounted concentric with said spindle, a secondary shaft geared to drive each of said flywheels simultaneously, a clutch mechanism for each of said flywheels disposed to engage and transmit power from the flywheel to said spindle, an adjustable motor elevating platform, a motor mounted on said platform, an adjusting mechanism to actuate said motor platform to position said motor for engagement with said spindle directly or with said secondary shaft, control mechanism to operate said clutches selectively, and safety interlocking means between said control mechanism and said motor elevating platform, whereby said control mechanism is rendered operable when said motor is positioned to drive said secondary shaft and is rendered inoperable by said safety means when said motor is connected to drive said spindle directly.

5. In a milling machine of the horizontal spindle type, a column, a spindle block slidably mounted on said column, a spindle rotatably journalled in said spindle block, a plurality of flywheels rotatably journalled in said spindle block independently of but concentrically with said spindle, an intermediate shaft connected to drive each of said flywheels, clutch means operable to effect a driving engagement between said spindle and any one of said flywheels, a power source selectively movable to drive said spindle directly or indirectly thru said intermediate shaft and a selective connection between said spindle and any of said flywheels, and interlocking means operable to prevent establishing more than one driving connection between said spindle and said power source; said spindle, power source, intermediate shaft, flywheels, and interlocking means comprising a selectively variable speed transmission providing a flywheel effect directly proportionate to the selected spindle speed.

6. A milling machine comprising a frame, a tool carrying spindle rotatably mounted in said frame, a plurality of gear trains arranged to drive said spindle at various speeds, a flywheel associated with each gear train, said flywheels each being of inertial effect appropriate to the driving speed of its associated gear train, and a clutch selectively operable to couple each flywheel directly to said spindle, the arrangement being such that said spindle is thereby provided with the flywheel effect appropriate to each of its speeds of operation.

7. In a machine tool, a column, a rotatable spindle in said column, a source of power, a plurality of rotatable flywheels in said column mounted concentric with said spindle, said flywheels being arranged to form selectively a driving connection between said power source and said spindle whereby said spindle may be driven at a predetermined speed with a proportionate flywheel effect, one of said flywheels being of large diameter for driving said spindle at slower speeds, said large diameter flywheel preventing the usual axially slidable and retractible overarms from being mounted in said column in closely cooperating axially spaced relationship to said spindle, a supporting bracket carrying two axially spaced overarms pivotally mounted on said column, said bracket being swingable about said pivotal mounting to an operating position against the face of said column, and removable clamping means to clamp said bracket to said column in the operating position in which said overarms are in closely spaced axially cooperating relationship to said spindle, said bracket being swingable about said pivotal mounting to an inoperative position whereby the upper face of said column is unobstructed for mounting a cutter equivalent in size to said large flywheel on said spindle.

8. A milling machine comprising a column, an overarm structure extending forwardly from said column, a cutter carrying spindle rotatably mounted in said column with its axis disposed parallel with said overarm structure, a flywheel of radius greater than the distance from said spindle axis to said overarm structure, said flywheel being mounted on said spindle adjacent to its cutter receiving end, and means removably supporting said overarm structure on said column in manner to permit its withdrawal from the region of said spindle end in direction other than toward said flywheel.

9. In a machine tool, a frame, a spindle rotatably mounted in said frame, a spindle driving shaft rotatably mounted in said frame, a plurality of trains of constantly meshing gears operatively connected to be driven by said driving shaft, clutching means arranged to clutch any one of said gear trains to said spindle to drive it at selected speed, a source of power for driving said spindle, and means to connect said source of power either to said driving shaft or directly to said spindle selectively.

10. In a milling machine, a column, a rotatable spindle in said column, a source of power, a variable speed transmission in said column selectively connectible to said spindle and to said power source to drive said spindle at a predetermined speed, a bracket pivotally mounted on the front upper edge of said column with the front face of said column forming a positive stop for the cooperating rear face of said bracket, two cylindrical overarms in said bracket in closely spaced axial cooperation with said spindle, removable clamping means to clamp said bracket to said column, an angular arm secured to said bracket extending upward and forward from said pivotal mounting, and a resilient connection between the upper end of said angular arm and the rearward upper part of said column, said resilient connection acting as a counterbalance so that on removal of said clamping means the bottom of said bracket will be urged outwardly from said column face, said bracket then being swingable about said pivotal mounting to an inoperative position on top of said column with said resilient connection acting as a check and cushioning device as said bracket approaches its inoperative position.

11. In a milling machine, a frame, a cutter carrying spindle rotatably mounted in said frame, a countershaft rotatably mounted in said frame adjacent to said spindle, means operatively connecting said countershaft to drive said spindle, a spindle motor bodily movable into direct connection with said spindle or into driving connection with said countershaft selectively, and power actuated mechanism arranged to effect said bodily movement of said motor.

12. In a milling machine, a frame, a cutter spindle rotatably mounted in said frame, a countershaft rotatably mounted in said frame adjacent to said spindle, a plurality of gear trains operatively arranged to transmit power from said countershaft to said spindle at various speed ratios, clutches disposed to connect said gear trains to said spindle selectively, a source of power arranged to be connected directly to said spindle or to said countershaft selectively, control lever mechanism arranged to operate said clutches, and an interlock mechanism operatively associated with said control lever mechanism to effect engagement of only one of said clutches at a time and to permit direct connection of said source of power to said spindle only after all of said clutches are disengaged.

13. In a milling machine, a column, a cutter spindle rotatably mounted in said column, a plurality of flywheels rotatably mounted in said column concentric with but independently of said spindle, a countershaft rotatably mounted in said column in parallel relationship with said spindle, gearing on said countershaft operatively connected to drive said flywheels simultaneously at different speed ratios, means to clutch each of said flywheels to said spindle alternatively for driving it at selected speed with appropriate flywheel effect, a driving motor movably mounted on said column, and means to couple said motor to said countershaft or directly to said spindle selectively.

14. A milling machine comprising a work table, a cutter spindle rotatably mounted to present a milling cutter to a workpiece on said table, a plurality of flywheels rotatably mounted concentric with said spindle but independently of said spindle, said flywheels being of different inertial effects adapted for operation with said spindle at different speeds of rotation, a driving train operatively connected to drive each of said flywheels at the speed corresponding to its inertial effect, and clutch mechanism arranged to couple any one of said flywheels to said spindle selectively, whereby said spindle may be driven at the speed and with the flywheel effect appropriate to the work at hand.

15. In a machine tool, a frame, a spindle rotatably mounted in said frame, a spindle driving shaft rotatably mounted in said frame, variable speed gearing operatively connecting said spindle driving shaft to said spindle for driving it selectively at various speeds, a motor for driving said spindle, and means disposed on said frame to operatively position said motor for direct coupling with said spindle driving shaft or with said spindle alternatively.

16. In a machine tool, a frame, a spindle rotatably mounted in said frame, a plurality of gear trains for driving said spindle at various speeds, a flywheel associated with and driven by each of said gear trains, said flywheels being disposed concentrically with said spindle and each being of inertial effect appropriate to its speed, and coupling means operative to connect any one of said flywheels directly to said spindle, whereby said spindle may be driven selectively at any of several speeds with the requisite flywheel effect.

17. In a machine tool, a compactly arranged transmission comprising a plurality of flywheels independently journalled about a common axis and arranged for axially slidable movement, a cutter carrying spindle journalled for rotation concentrically with said flywheels, a plurality of clutch elements affixed to said spindle, individual clutch elements affixed to said flywheels complementary to said spindle clutch elements, an intermediate power shaft rotatably journalled and in driving engagement with said flywheels, a power source selectively movable and connectible to drive said intermediate shaft or said spindle direct, individual shifting levers connected to move each of said flywheels into clutch engagement with said spindle, and a manually operable interlocking member coacting with said shifting levers and said movable power source, said interlocking member preventing engagement of said flywheel clutch elements with said spindle clutch elements when said power source is coupled to drive said spindle, and said interlocking member preventing selective engagement of more than one flywheel to drive said spindle when said power source is coupled to said intermediate shaft.

18. In a milling machine, a work supporting table, a cutter carrying spindle rotatably mounted in position to present a milling cutter to a workpiece on said table, a plurality of driving trains operatively arranged to drive said spindle alternatively at different speeds, and a flywheel driven by each of said trains, said flywheels being so arranged as to provide the desired flywheel effect for each speed of operation to said spindle.

19. In a machine tool, a column, an operating spindle rotatably mounted in said column with both ends projecting therefrom, a countershaft journalled in said column parallel with said spindle and with one end projecting from said column, transmission means for transmitting power from said countershaft to said spindle at selected speed ratios, and a motor movably mounted on said column and arranged to be coupled selectively to the projecting end of said countershaft or alternatively to the projecting end of said spindle.

20. A milling machine comprising a column, a plurality of flywheels presenting central openings, said flywheels being rotatably mounted in said column in axial alignment, a cutter carrying spindle disposed through said openings of said aligned flywheels and journalled in said column independently thereof, and a plurality of clutches associated with said flywheels respectively and operative to connect any of said flywheels to said spindle selectively.

21. In a milling machine, a cutter driving spindle, a countershaft operatively connected to drive said spindle, a driving motor movably mounted on said machine and arranged for direct coaxial connection with said spindle or with said countershaft selectively, clutching means operatively arranged to couple said countershaft to said spindle selectively, and interlocking mechanism operatively connected with said clutching means and arranged to prevent movement of said motor into coaxial relationship with said spindle while said clutching means is engaged and to prevent engagement of said clutching means while said motor is connected with said spindle.

22. A machine tool driving mechanism comprising a plurality of flywheels of graduated size journalled in a machine housing, a rotatably journalled intermediate shaft connected to drive said flywheels at different speeds, a spindle journalled in said housing concentrically with but independently of said flywheels, a movable power source selectively connectible to said spindle or to said intermediate shaft, means for effecting a driving engagement between any of said flywheels and said spindle, and interlocking means effective to prevent the engagement of more than one driving connection at a time between said power source and said spindle.

23. In a machine tool having a rotatably mounted spindle, a variable speed gear mechanism selectively engageable to drive said spindle at a selected speed ratio, a motor selectively positionable and connectible to drive said gear mechanism or to drive said spindle directly, control mechanism operatively disposed to shift said variable speed gear mechanism, motor positioning control mechanism arranged to connect said motor to said gear mechanism or directly to said spindle selectively, and an interlocking mechanism interconnecting said control mechanisms whereby said motor is disposed to drive said spindle directly only when said gear mechanism is disconnected from driving said spindle, and to drive said gear mechanism only when said motor is disconnected from direct connection with said spindle.

24. In a milling machine, a column, a spindle journalled horizontally in said column in manner to present an arbor receiving end exteriorly thereof, a relatively large wheel mounted concentrically on said spindle interiorly of said column, means to drive said spindle and said large wheel, an overarm structure mounted on said column exteriorly thereof and adapted to be clamped to the machine in an operating position parallel to and at less distance from the axis of said spindle than the radius of said large wheel, and means to move said overarm structure laterally from its operating position to an inactive position on the machine.

25. In a milling machine, a column, a cutter carrying spindle rotatably mounted in said column with its cutter receiving end projecting therefrom, a large flywheel mounted concentrically with said spindle within said column and adjacent to the cutter receiving end thereof, an overarm structure carried by said column parallel with and projecting beyond said spindle, said overarm structure being disposed closer to the axis of said spindle than the radius of said large flywheel, and means supporting said overarm structure for retraction laterally from the region of said spindle without interfering with said flywheel within said column.

26. A milling machine comprising a column, a cutter carrying spindle rotatably mouned in said column, a flywheel of large diameter mounted in said column concentrically with said spindle, a bracket removably mounted on the front of said column above said spindle, and an overarm structure extending outwardly from said bracket parallel with said spindle, the arrangement being such that said overarm structure and its supporting bracket may be removed from the region of said spindle to permit the use of large diameter cutters.

27. In a machine tool, a column, a rotatable spindle in said column, a plurality of rotatable flywheels mounted concentric with said spindle, one of said flywheels being of such a large diameter as to prevent the slidable mounting of the usual retractible overarms in said column in cooperating relationship with said spindle, and an overarm supporting bracket pivotally mounted on said column, said bracket positionable in an operating position so that said overarms are in cooperating relationship with said spindle and said bracket removable to an inoperative position for mounting large diameter cutters directly on said spindle.

28. In a machine tool, a rotatably mounted tool retaining spindle, a plurality of flywheels rotatably mounted and concentrically disposed relative to said spindle, a power source disposed to constantly drive each of said flywheels in a predetermined speed range, and clutch means associated with each of said flywheels and selectively operable to couple the same to said spindle and impart an appropriate flywheel effect to said spindle for a particular speed range.

29. In a machine tool, a cutter driving spindle rotatably mounted in said machine tool, a low speed flywheel rotatably mounted concentrically with said spindle, a power source operatively disposed to drive said flywheel in a low speed range, a clutch means to couple said low speed flywheel to said spindle selectively, a high speed flywheel rotatably mounted concentrically with said spindle, a power source operatively disposed to drive said flywheel in a high speed range, and a clutch means to couple said high speed flywheel to said spindle selectively, whereby the proper flywheel effect is imparted to said spindle when said first named clutch is actuated to couple said low speed flywheel with said spindle and the proper flywheel effect is imparted to said spindle when said second named clutch is actuated to couple said high speed flywheel with said spindle.

30. A machine tool spindle transmission mechanism comprising a rotatably mounted cutter retaining spindle, a plurality of flywheels concentrically disposed with said spindle but independently rotatable thereof with each flywheel predeterminately designed to be effective in a given speed range, a power source to drive each of said flywheels in a particular speed range, and coupling means associated with each of said flywheels and selectively operable to couple the respective flywheel with said spindle and thereby impart the correct flywheel effect to said spindle for a given speed range.

31. In a machine tool structure wherein a tool retaining spindle is provided with a large flywheel adjacent the fore end thereof in a manner to prevent the utilization of axially slidable and retractable overarms from being mounted in said structure, the combination of a supporting bracket including two axially spaced overarms, a pivotal mounting for said bracket, and removable clamping means to clamp said bracket, whereby said overarm bracket may be selectively positioned in a closely spaced axially cooperating relation with the spindle irrespective of the obstruction resulting from the inclusion of a large flywheel on the fore end of the spindle.

References Cited in the file of this patent

UNITED STATES PATENTS

| Number | Name | Date |
|---|---|---|
| 293,892 | Lincoln | Feb. 19, 1884 |
| 432,529 | Hollingsworth | July 22, 1890 |
| 771,499 | Rogers | Oct. 4, 1904 |
| 884,243 | Wahlstrom | Apr. 7, 1908 |
| 1,382,526 | Miehle | June 21, 1921 |
| 1,543,008 | Hanson et al. | June 23, 1925 |
| 1,612,059 | Ross | Dec. 28, 1926 |
| 1,791,747 | Armitage | Feb. 10, 1931 |
| 1,923,935 | Kearney | Aug. 22, 1933 |
| 1,926,332 | Fournier | Sept. 12, 1933 |
| 2,034,221 | Armitage | Mar. 17, 1936 |
| 2,217,938 | Armitage | Oct. 15, 1940 |
| 2,218,469 | Hassman | Oct. 15, 1940 |
| 2,226,431 | Hassman et al. | Dec. 24, 1940 |
| 2,275,783 | Martellotti | Mar. 10, 1942 |
| 2,371,089 | Weddell | Mar. 6, 1945 |

FOREIGN PATENTS

| Number | Country | Date |
|---|---|---|
| 89,126 | Germany | Aug. 10, 1922 |
| 510,898 | Germany | Oct. 24, 1930 |